June 5, 1923.

J. H. CARGILL 1,458,029

SAFETY PIN

Filed July 7, 1922

WITNESSES
Frederick Diehl.
Harrison Ost

INVENTOR
James H. Cargill
BY Munn & Co.
ATTORNEYS

Patented June 5, 1923.

1,458,029

UNITED STATES PATENT OFFICE.

JAMES H. CARGILL, OF JERSEY CITY, NEW JERSEY.

SAFETY PIN.

Application filed July 7, 1922. Serial No. 573,274.

*To all whom it may concern:*

Be it known that I, JAMES H. CARGILL, a citizen of the United States, and a resident of Jersey City, in the county of Hudson and State of New Jersey, have invented a new and Improved Safety Pin, of which the following is a full, clear, and exact description.

This invention has relation to fastening devices and has particular reference to an improvement in safety pins.

The invention contemplates as an object a safety pin which positively precludes accidental retraction of the pointed extremity from the article to which it is applied in event of the displacement of the same from the point engaging catch.

As a further object the invention contemplates a safety pin which affords a maximum capacity in a pin of minimum size.

As a still further object the invention provides a safety pin of simple construction, inexpensive to manufacture and one which is thoroughly reliable and highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1:
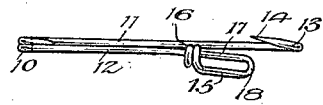
Figure 1 is a plan view of a safety pin constructed in accordance with the invention, illustrating the same in open condition.
Figure 3:
Fig. 3 is a plan view illustrating the same in closed condition.
Figure 2:
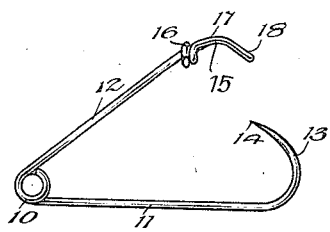
Fig. 2 is a side view thereof.
Figure 4:
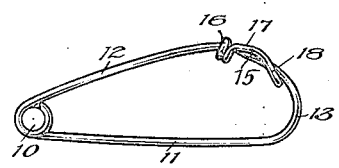
Fig. 4 is a side view of the same.
Figure 5:
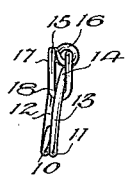
Fig. 5 is an end view thereof.

Referring to the drawing by characters of reference, the pin which is preferably constructed from a single length of resilient material such as wire is coiled medially upon itself as at 10 to provide a pair of legs 11 and 12 which are normally separated at their free ends. The free end of the leg 11 is provided with a hooked terminal 13 which is pointed or sharpened as at 14, said pointed or sharpened terminal being disposed approximately in a direction toward its juncture with the opposite leg 12. The free extremity of the leg 12 is provided with a return bend 15 which is coiled or otherwise connected as at 16 to said leg to produce an embracing head or loop 17 for interengagement with the hooked terminal 13 when the pin is in closed condition. As illustrated the embracing head or loop 17 when disengaged is disposed laterally at an angle, while the hooked terminal 13 of the leg 11 is disposed laterally at an opposite angle to facilitate the engagement of the pin with the article to which it is applied. The bight 18 of the embracing head or loop 17 is bent at an angle or inclined with respect to the major portion thereof in order that the same will engage under the hooked terminal when the free ends of the legs 11 and 12 are interengaged, while the pointed terminal 14 will lie within the space defined by the head or loop and under one of the leads thereof adjacent the coil or connection 16 in order to protect and cover the same. In use of the pin, the point 14 is inserted and passed through the article to be secured by the pin, the hooked terminal 13 serving to dispose said point exteriorly in order to eliminate all possibility of injury by the retraction of the leg 11 from the article. The hook 13 positively precludes accidental retraction, thus especially fitting the pin for a baby's wearing apparel. After the leg 11 has been properly associated with the article, the headed or looped free extremity 17 of the leg 12 is interengaged with the hooked terminal of the leg 11 to house and cover the point 14. The elimination of the usual form of head for engagement with the pointed leg of an ordinary safety pin permits of a maximum capacity in a safety pin of minimum length. As a further advantage the elimination of the mental catch or head and substitution of the embracing head or loop constructed integral with the remainder of the pin effects an economy in the production of the same.

I claim:

A safety pin comprising a pair of legs having hinged connection with each other at one of their ends, said hinged connection operating to normally effect relative separation of the opposite free ends, a hooked pointed terminal at the free end of one leg and a complementary looped terminal at the free end of the opposite leg having a bight portion adapted to engage under and embrace the hooked pointed terminal of the other leg for maintaining the free ends of the legs in closed relation, one of the leads of said looped terminal being disposed over the pointed terminal for covering and protecting the same.

JAMES H. CARGILL.